United States Patent
Carpenter et al.

(10) Patent No.: US 10,645,177 B2
(45) Date of Patent: *May 5, 2020

(54) COOKIE BASED SESSION TIMEOUT DETECTION AND MANAGEMENT

(71) Applicant: INTERNATIONAL BUSINESS MACHINES CORPORATION, Armonk, NY (US)

(72) Inventors: William J. Carpenter, Bothell, WA (US); Hai Ji, Beijing (CN); Zi Jian Ji, TianJin (CN); Yuan Yuan Li, Beijing (CN); Wen Bo Ma, Beijing (CN); Jia Mi, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 28 days.

This patent is subject to a terminal disclaimer.

(21) Appl. No.: 15/491,397

(22) Filed: Apr. 19, 2017

(65) Prior Publication Data
US 2018/0309836 A1 Oct. 25, 2018

(51) Int. Cl.
*H04L 29/08* (2006.01)
*H04L 29/06* (2006.01)

(52) U.S. Cl.
CPC ........ *H04L 67/146* (2013.01); *H04L 63/0442* (2013.01); *H04L 63/08* (2013.01); *H04L 67/02* (2013.01); *H04L 67/025* (2013.01)

(58) Field of Classification Search
CPC ...... H04L 67/025; H04L 67/146; H04L 63/08
See application file for complete search history.

(56) References Cited

U.S. PATENT DOCUMENTS

| | | |
|---|---|---|
| 6,421,768 B1 | 7/2002 | Purpura |
| 6,490,624 B1 | 12/2002 | Sampson |
| 7,216,236 B2 | 5/2007 | Kou et al. |
| 7,240,192 B1 | 7/2007 | Paya et al. |
| 7,571,322 B2 | 8/2009 | Karoubi |
| 7,953,861 B2 | 5/2011 | Yardley |
| 8,200,834 B2 | 6/2012 | Williams |
| 9,083,691 B2 | 7/2015 | Banford |
| 9,185,105 B2 | 11/2015 | Miller et al. |
| 9,467,519 B2 | 10/2016 | Duterque |

(Continued)

OTHER PUBLICATIONS

Barbato et al. RFC 6896. "SCS: Koanlogic's Secure Cookie Sessions for HTTP". Mar. 2013. pp. 1-23.

(Continued)

*Primary Examiner* — John M Macilwinen
(74) *Attorney, Agent, or Firm* — Alexis N. Hatzis

(57) ABSTRACT

A method, computer system, and a computer program product for detecting a session status based on a cookie associated with the session is provided. The present invention may include receiving an access request to a specified location associated with a server computer. The present invention may also include determining that the received access request has the cookie corresponding with the specified location. The present invention may also include receiving a last refresh time from the cookie. The present invention may then include determining the session status based on the retrieved last refresh time, a current request time, a refresh interval, and an overdue value.

20 Claims, 7 Drawing Sheets

(56) References Cited

U.S. PATENT DOCUMENTS

| | | | |
|---|---|---|---|
| 2002/0161893 A1* | 10/2002 | Wical | G06Q 30/06 |
| | | | 709/227 |
| 2004/0111621 A1* | 6/2004 | Himberger | H04L 63/083 |
| | | | 713/182 |
| 2005/0015601 A1* | 1/2005 | Tabi | G06F 21/6227 |
| | | | 713/182 |
| 2007/0299928 A1 | 12/2007 | Kohli et al. | |
| 2009/0177779 A1 | 7/2009 | DeVal et al. | |
| 2011/0320820 A1* | 12/2011 | Wray | G06F 21/31 |
| | | | 713/176 |
| 2012/0209904 A1 | 8/2012 | Huang | |
| 2014/0059354 A1 | 2/2014 | Jiang et al. | |
| 2014/0237539 A1 | 8/2014 | Wing et al. | |
| 2015/0058493 A1 | 2/2015 | Adams et al. | |
| 2015/0088978 A1 | 3/2015 | Motukuru et al. | |
| 2015/0149531 A1 | 5/2015 | Wohlert et al. | |
| 2015/0332338 A1 | 11/2015 | Chelko et al. | |
| 2016/0014110 A1 | 1/2016 | Kurspahic | |

OTHER PUBLICATIONS

GitHub. "gonzalad commented". https://github.com/zmartzone/lua-resty-openidc/issues/55. May 22, 2017. pp. 1-3.

IBM: List of IBM Patents or Patent Applications Treated As Related (Appendix P), Apr. 10, 2018, pp. 1-2.

Carpenter et al., Pending U.S. Appl. No. 15/859,550, filed Dec. 31, 2017, titled Cookie Based Session Timeout Detection and Management, pp. 1-28.

IBM, "Session Management," IBM Knowledge Center—WebSphere Commerce, p. 1-11, WebSphere Commerce Version 7, https://www.ibm.com/support/knowledgecenter/SSZLC2_7.0.0/com.ibm.commerce.admin.doc/concepts/csesmsession_mgmt.htm, Accessed on Feb. 22, 2017.

Mell et al., "The NIST Definition of Cloud Computing," National Institute of Standards and Technology, Sep. 2011, p. 1-3, Special Publication 800-145.

Palmer, "Secure Session Management With Cookies for Web Applications," iSEC Partners, Sep. 10, 2008, p. 1-18, Version 1.1.

* cited by examiner

COOKIE BASED SESSION TIMEOUT DETECTION AND MANAGEMENT

BACKGROUND

The present invention relates generally to the field of computing, and more particularly to browser cookies.

Many systems use browser side session tokens to validate a user's session. Idle timeouts vary widely across the industry to prevent idle terminal threats. Persistent cookies have a natural expiration time, whereas in-memory cookies do not, and never expire unless the user closes the browser.

SUMMARY

Embodiments of the present invention disclose a method, computer system, and a computer program product for detecting a session status based on a cookie associated with the session. The present invention may include receiving an access request to a specified location associated with a server computer. The present invention may also include determining that the received access request has the cookie corresponding with the specified location. The present invention may also include receiving a last refresh time from the cookie. The present invention may then include determining the session status based on the retrieved last refresh time, a current request time, a refresh interval, and an overdue value.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
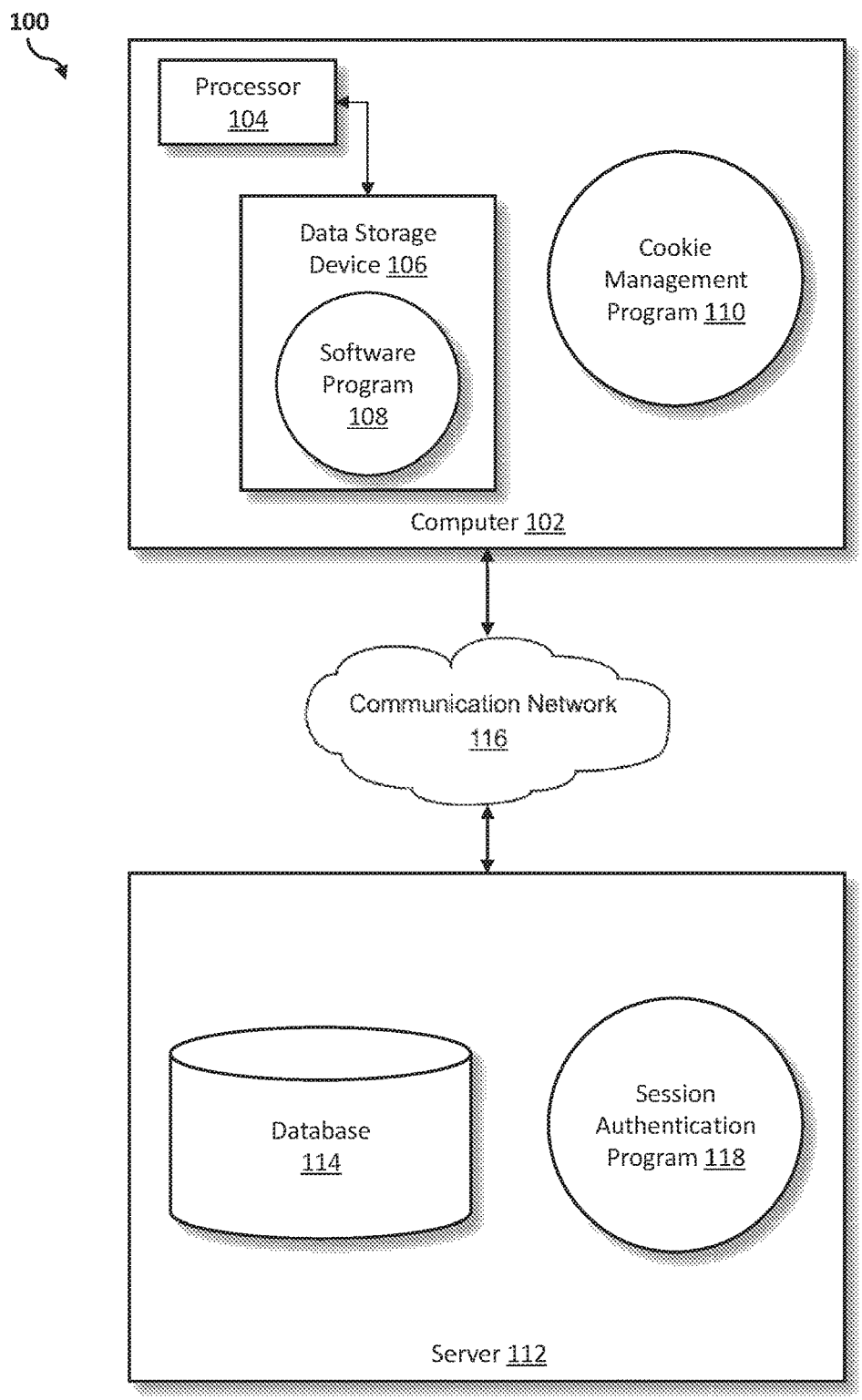
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for cookie based session timeout. As such, the present embodiment has the capacity to improve the technical field of cookie based session expiration by using a ranged timeout method. More specifically, three parameters are used, two of which are tunable to balance accuracy against performance. The time of the last session refresh may be saved in the client's session token's encrypted data, and the values set for session idling and idle overdue may be configured on the server. The session may be refreshed and a new value for the last session refresh may be assigned if the session is resumed during the allotted time period and before the time set for session timeout on the server. The timeout period may occur upon expiration of both the idle and overdue periods.

In order to perform server node scale-out and handle user sessions easily, many systems use browser side session tokens to handle the user sessions. The length of idle timeouts of said sessions varies widely across the industry to prevent threat. Thus, detecting cookie based session timeout becomes a problem. Persistent cookies have a natural expiration time, however session in memory may be safer than session on a hard disk. In-memory session tokens may not have a timeout setting and may not expire unless the user closes the browser.

Therefore, it may be advantageous to, among other things, provide a way to detect session status (i.e. valid session or expired session) and utilize a ranged timeout to handle the cookie based session expiration. The ranged timeout method may utilize three attributes, LastRefreshTime, RefreshInterval, and Overdue. LastRefreshTime may represent the time the cookie was created, RefreshInterval may represent the refresh frequency, and Overdue may contribute to the cookie lifecycle.

As described previously, the ranged timeout solution may be based on three attributes, including a last session refresh attribute, a session idle attribute, and an idle overdue attribute. The idle period decides the refresh frequency and the idle overdue contributes to the cookie lifecycle. A longer idle period may result in less refresh and a longer timeout range. A shorter idle overdue may result in more frequent user login. This ranged timeout solution uses a session token which may be kept in memory where there is no timeout setting.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a cookie management program 110. The networked computer environment 100 may also include a server 112 that is enabled to run a session authentication program 118 that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the cookie management program 110 and session authentication program 118 may interact with a database 114 that may be embedded in various storage devices, such as, but not limited to a computer/mobile device 102, a networked server 112, or a cloud storage service.

According to the present embodiment, a user using a client computer 102 or a server computer 112 may use the cookie management program 110 and session authentication program 118 to detect session status and handle cookie based session timeout. The session authentication method is explained in more detail below with respect to FIGS. 2A and 2B.

Figure 2A:
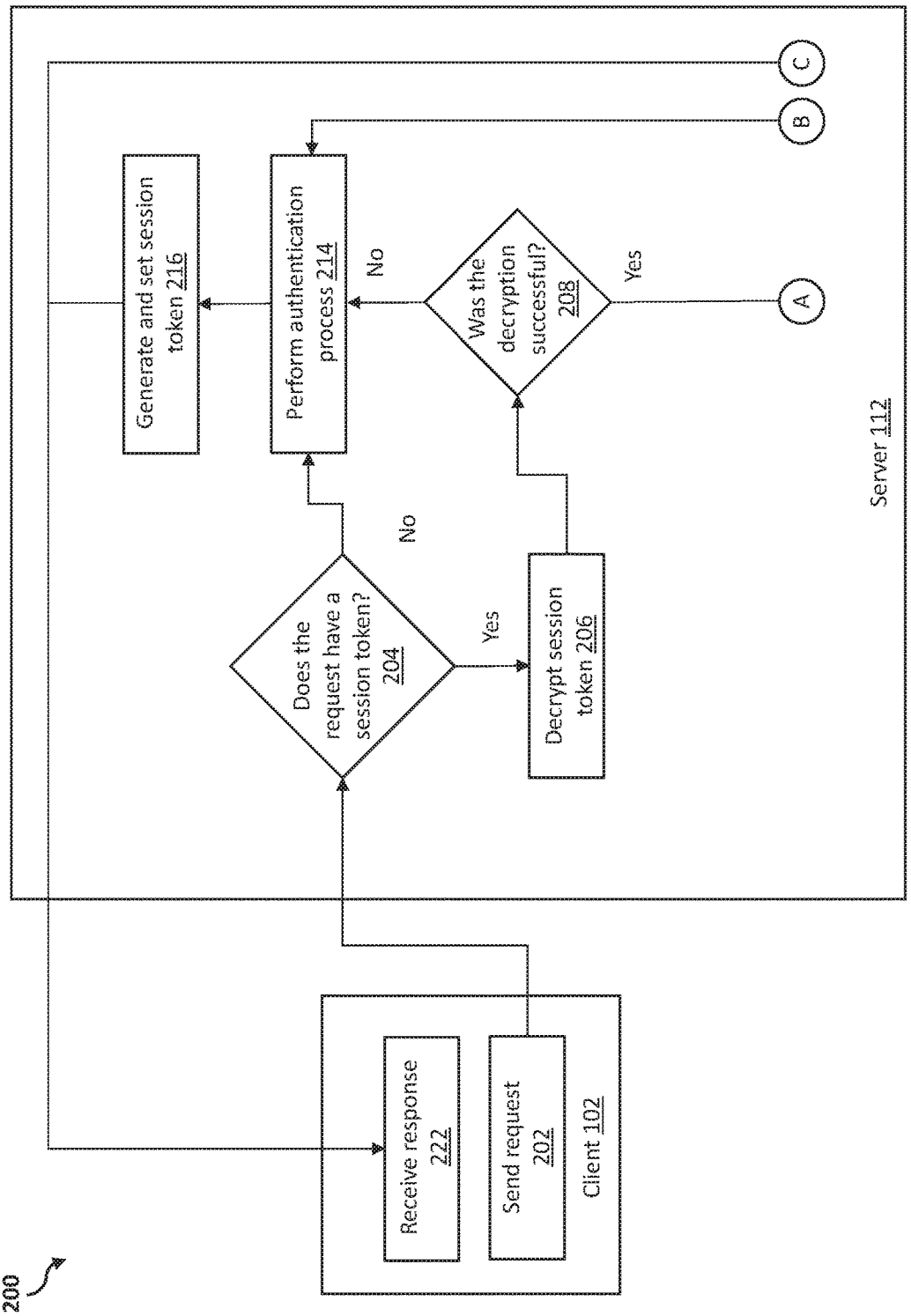
FIGS. 2A and 2B are an operational flowchart illustrating a process for session authentication according to at least one embodiment.
Figure 2B:
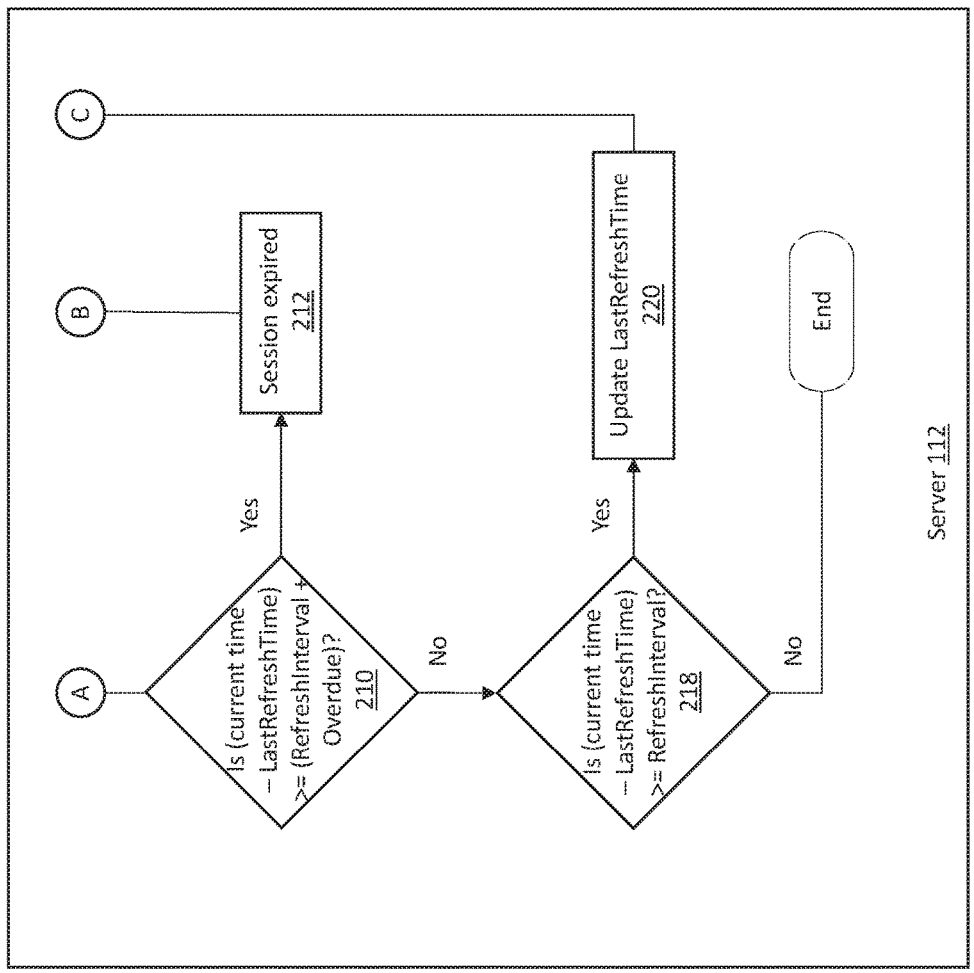

Referring now to FIGS. 2A and 2B, an operational flowchart illustrating the exemplary session authentication process 200 used by the cookie management program 110 and session authentication program 118 according to at least one embodiment is depicted.

At 202 a request is sent by the client computer 102 to establish a connection between the client computer 102 and the server 112. A connection may be established between the client computer 102 and server computer 112 in order for communication to occur over the client-server network (i.e. the communication network 116). For example, for a client computer 102 to access a specified location on the server computer 112 (i.e. a secure hypertext transfer protocol (http) website, a program, or the like) the client computer 102 may need to send a request with session token (i.e. the cookie) to the server computer 112. The server computer 112 may check the request to see if the request contains the requisite token, signaling to the server computer 112 that the client computer 102 may have visited the site in the past.

Next, at 204, the server computer 112 determines if the client computer's 102 request contains the site's specific session token (i.e. the cookie). The server computer 112 receives the request from the client computer 102 via the communication network 116. If the client computer 102 has visited the site in the past, then the client computer 102 may have the session token, and the client computer 102 may have sent the session token to the server computer 112 with the client computer's 102 request. The session token may further contain a unique session identifier, which will also be sent to the server computer 112 every time the client computer 102 visits a new page on the site. For example, the unique session identifier may contain a string of numbers specific to the client computer 102 machine. If the client computer 102 has not previously visited the site, then the client computer's 102 request may not contain the specific session token, and the server computer 112 may need to authenticate the client computer 102.

If at 204 the server computer 112 determined that the client computer 102 sent the session token with the request, then the server computer 112 will decrypt the session token at 206. The decryption process entails converting the encrypted session token into a format which may be readable by the server computer 112. The server computer 112 may be the only machine with the cryptographic key needed to decrypt the symmetrically or unsymmetrically encrypted session token.

Next, at 208, the server computer 112 determines if the decryption was successful, i.e. whether the session token variable is readable. If the server computer 112 is unable to decrypt the session token, then the server computer 112 may perform the re-authentication process as will be described in greater detail below at 214. A session token may then be sent to the client computer 102, and a new value for the LastRefreshTime parameter may be set. If the decryption at 208 was successful, then the process for determining session timeout validation may begin.

Next, at 210, the server computer 112 determines whether the difference between the current time that the client computer's 102 request is received by the server computer 112 (i.e. the current request time) and the value saved in the client computer's 102 session token for LastRefreshTime (i.e. last refresh time) is greater than or equal to the aggregate of RefreshInterval and Overdue (i.e. the difference value), values which are configured and saved in the server computer 112. The server computer 112 may query the value of the current time that the client computer's 102 request is received by the server computer 112, and retrieves from the client computer's 102 session token the value of LastRefreshTime. Additionally, the server computer 112 may retrieve from memory or network storage the values of RefreshInterval and Overdue.

If the current time that the client computer's 102 request is received by the server computer 112 minus the value saved in the client computer's 102 session token (i.e. the cookie) for LastRefreshTime is greater than or equal to the aggregate of RefreshInterval and Overdue (i.e. the aggregate value) at 210, then the session has expired at 212. This expiration is a timeout mechanism which may be configured to prevent a fake instance of the client computer 102 after a period of inactivity.

If the server computer 112 determined that the request does not have a session token at 204, if the decryption was not successful at 208, or if the session expired at 212, then the client authentication process is performed at 214. The client authentication process may enable the server computer 112 to obtain identifying information from the client computer 102. Identifying information may include the unique session identifier, previously discussed, which may be comprised of a string of numbers specific to the client computer 102.

Next, at 216, the server computer 112 generates and sets the session token. As was previously discussed, the session token is also known as the cookie. Within the session token, the server computer 112 may set a value for LastRefreshTime, representing the time that the session token was created. The LastRefreshTime value may be saved in the session token's encrypted data portion to prevent a fake instance of the client computer 102 machine. The value of LastRefreshTime may not be saved on the server computer 112. The server computer 112 may save two parameters, RefreshInterval and Overdue, representing the period of time in which the system may be idle, and the period of time which exceeds the idle time and does not require re-authentication of the client computer 102, respectively. When the overdue period is entered, the server computer 112 may update the value of LastRefreshTime saved in the client computer's 102 session token. Thereafter, the session token, or cookie, may be sent from the server computer 112 over the communication network 116 to the client computer 102.

If, at 210, the current time that the client computer's 102 request is received by the server computer 112 minus the value saved in the client computer's 102 session token for LastRefreshTime is not greater than or equal to (i.e. less than) the aggregate of RefreshInterval and Overdue, then the server computer 112 determines if the current time that the client computer's 102 request is received by the server computer 112 minus the value saved in the client computer's 102 session token for LastRefreshTime is greater than or equal to RefreshInterval at 218.

If at 218, the difference between the current time that the client computer's 102 request is received by the server computer 112 and the value saved as LastRefreshTime is greater than or equal to the configured value for RefreshInterval, then the session is still active at 220, and the LastRefreshTime variable is updated in the client computer's 102 session token to reflect the current time of the server computer 112. The client computer's 102 session token with updated LastRefreshTime may be encrypted and sent back to the client computer 102 over communication network 116.

If, at 218, the server computer 112 determined that the current time that the client computer's 102 request is received by the server computer 112 minus the value saved as LastRefreshTime was not greater than or equal to (i.e. less than) the configured value on the server computer 112 for RefreshInterval, then the session is valid. The value of LastRefreshTime may not be updated when the current time that the client computer's 102 request is received by the server computer 112 minus the value saved for LastRefreshTime in the client computer's 102 session token is not greater than or equal to RefreshInterval. Thus, the user's session is still valid and the unaltered session token on the client computer 102 may not be updated.

Then, at 222, the client computer 102 receives a session token from the server computer 112. The session token may have an updated LastRefreshTime as described at 216. Furthermore, the client computer 102 may receive the session token via communication network 116.

Figure 3:
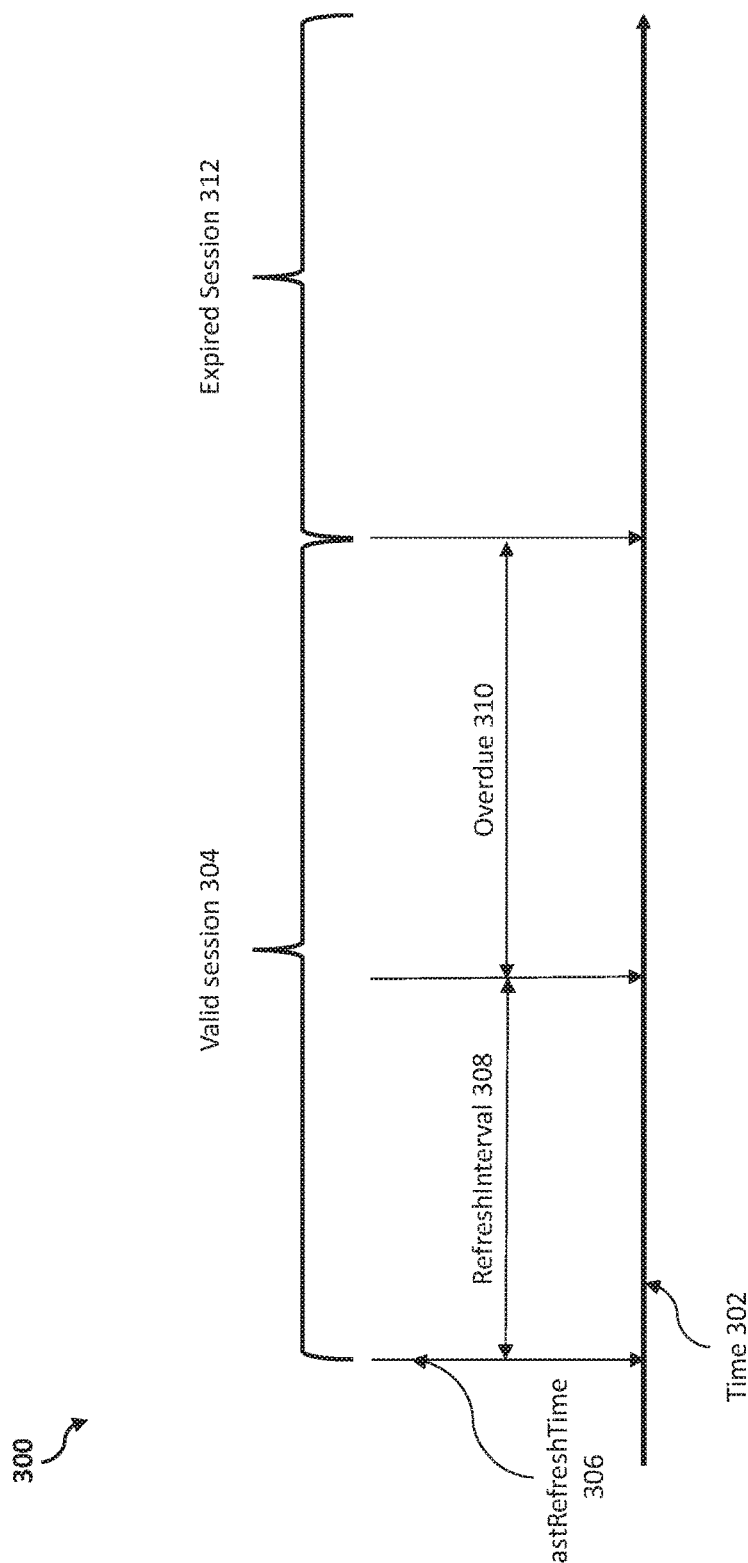
FIG. 3 is an exemplary illustration of session timeout scenario according to at least one embodiment.

Referring now to FIG. 3, an exemplary illustration of session timeout scenario 300 according to at least one embodiment is depicted. The illustrated session timeout scenario 300 denotes both a valid session 304 and expired session 312 over a period of time 302, both of which are described above. A valid session 304, previously discussed at 218, occurs when the current time that the client computer's 102 request is received by the server computer 112 minus the LastRefreshTime 306 is less than, greater than, or equal to RefreshInterval 308, and is not greater than or equal to the aggregate of both RefreshInterval 308 and Overdue 310. The expired session 312, previously discussed at 212, represents an occasion whereby the current time that the client computer's 102 request is received by the server computer 112 minus the LastRefreshTime 306 is greater than the aggregate of both RefreshInterval 308 and Overdue 310. This is referred to in the figure as expired session 312. As previously discussed, the timeout period, or expired session 312, is configured to prevent a fake instance of the client computer 102. When the timeout period is entered, the user may be required to re-authenticate the client computer 102 as discussed previously at 214, and thereafter, to generate and set the session token cookie as discussed previously at 216.

For example, a human user Elaine may open a web browser on the client computer 102 and attempt to access a secure http website for her bank account with Bank B. The request for access to the secure http website will be sent from Elaine's computer (i.e. client computer 102) to the server computer 112, as discussed previously at 202.

Then, the server computer 112 will determine whether Elaine's request contains a session token, or cookie, as discussed previously at 204. Here, Elaine's request (i.e. client computer's 102 request) contains a session token, indicating that Elaine has accessed Bank B's http website in the past. Furthermore, the session token contains a value for LastRefreshTime 306. In order to access LastRefreshTime 306, the server computer 112 will decrypt the session token, as discussed previously at 206, to convert the symmetrically encrypted session token into a format that is readable by the server computer 112.

Upon successful decryption of the session token, the server computer 112 may obtain the value of LastRefreshTime 306 saved in Elaine's session token, as discussed previously at 208. The server computer 112 may also query to obtain the current time the request is received, and may determine whether the current time of Elaine's request minus LastRefreshTime 306 is greater than or equal to the aggregate of RefreshInterval 308 and Overdue 310, as discussed previously at 210.

The time that Elaine's request is received by the server computer 112 is 12:46 p.m., the LastRefreshTime 306 is 12:01 p.m., the RefreshInterval 308 is configured to 10 minutes on the server computer 112, and the Overdue 310 is configured to 15 minutes on the server computer 112. Therefore, the current time of Elaine's request minus LastRefreshTime 306 is greater than or equal to the aggregate of RefreshInterval 308 and Overdue 310, and the timeout period has been reached and the session has expired, as discussed previously at 212. An expired session will require Elaine to re-authenticate, or sign in again, on Bank B's website, as discussed previously at 214. A session token will then be generated and set, as discussed previously at 216. The session token will be sent back to and received by Elaine's computer (i.e. client computer 102), as discussed previously at 222.

If the time that Elaine's request was received by the server computer 112 was 12:21 p.m., the LastRefreshTime 306 was 12:01 p.m., and RefreshInterval 308 and Overdue 310 were still configured to 10 minutes and 15 minutes, respectively, then the current time of Elaine's request minus LastRefreshTime 306 would not be greater than or equal to the aggregate of RefreshInterval 308 and Overdue 310, as discussed previously at 212. Elaine would not be prompted to re-authenticate in this instance. However, the current time of Elaine's request minus LastRefreshTime 306 would be greater than or equal to the value of RefreshInterval 308, as discussed previously at 220. Thus, the overdue period would be reached, and the value of LastRefreshTime 306 would be updated to reflect the current time of Elaine's request. This value would be symmetrically or unsymmetrically encrypted in the session token and sent to Elaine's computer over communication network 116, as discussed previously at 222.

It may be appreciated that FIGS. 2A, 2B, and 3 provide only an illustration of one embodiment and do not imply any limitations with regard to how different embodiments may be implemented. Many modifications to the depicted embodiments may be made based on design and implementation requirements.

Figure 4:
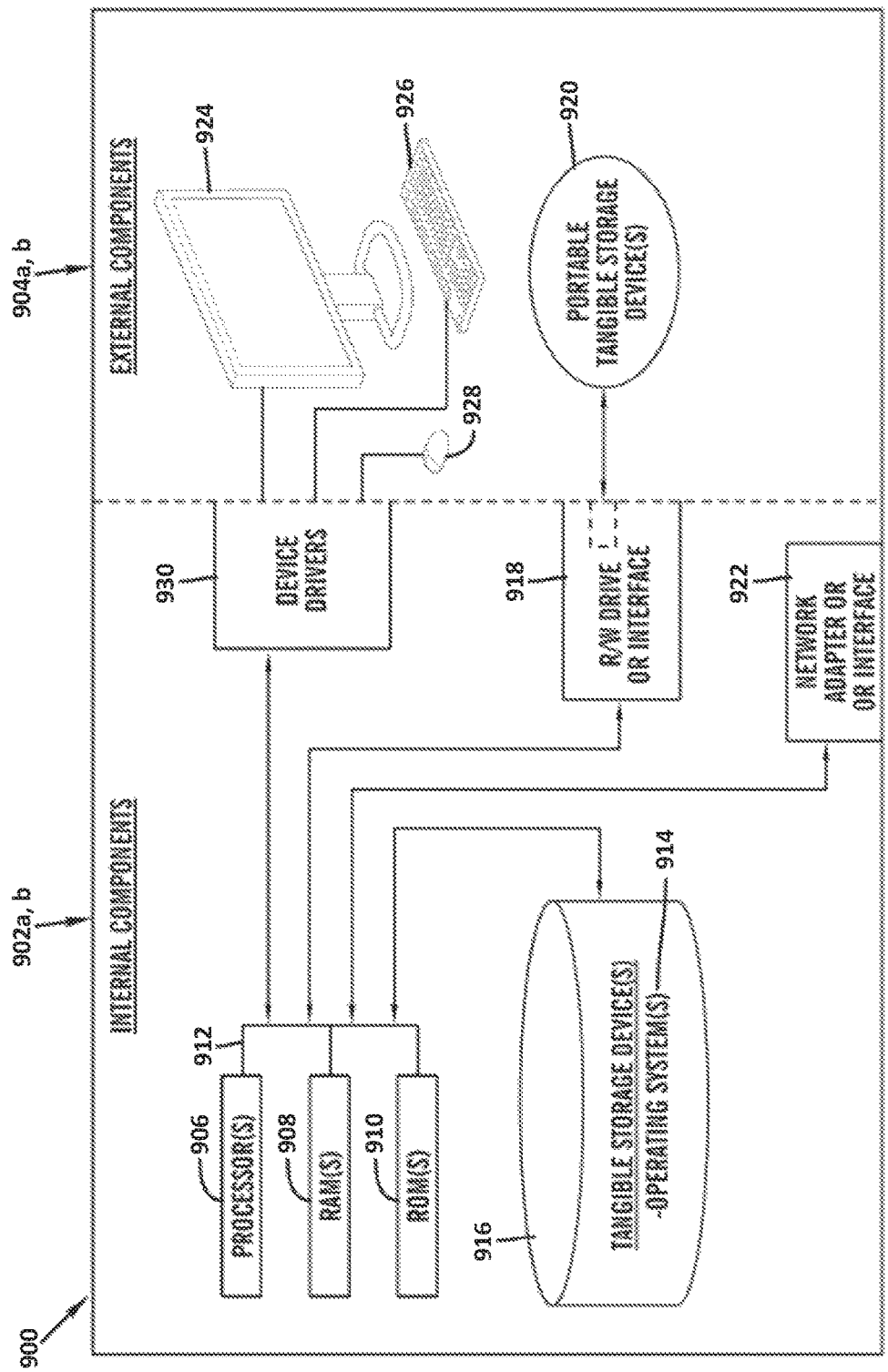
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 4. Each of the sets of internal components 902 a, b includes one or more processors 906, one or more computer-readable RAMs 908, and one or more computer-readable ROMs 910 on one or more buses 912, and one or more operating systems 914, and one or more computer-readable tangible storage devices 916. The one or more operating systems 914, the software program 108 and the cookie management program 110 in client computer 102, and the session authentication program 118 in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory, or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108, the cookie management program 110, and the session authentication program 118 can be stored on one or more of the respective portable computer-readable tangible storage devices 920, read via the respective R/W drive or interface 918, and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the cookie management program 110 in client computer 102 and the session authentication program 118 in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the cookie management program 110 in client computer 102 and the session authentication program 118 in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
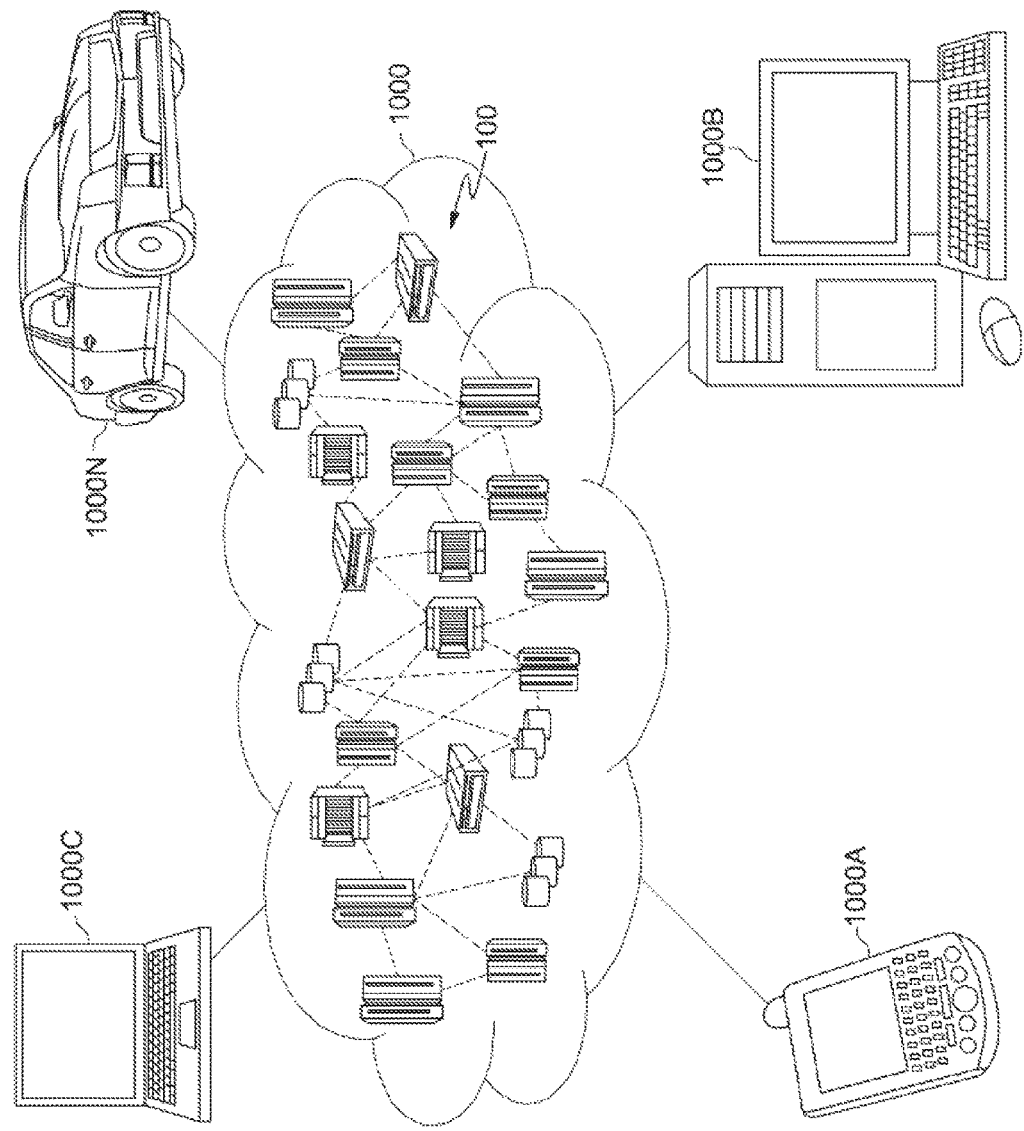
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
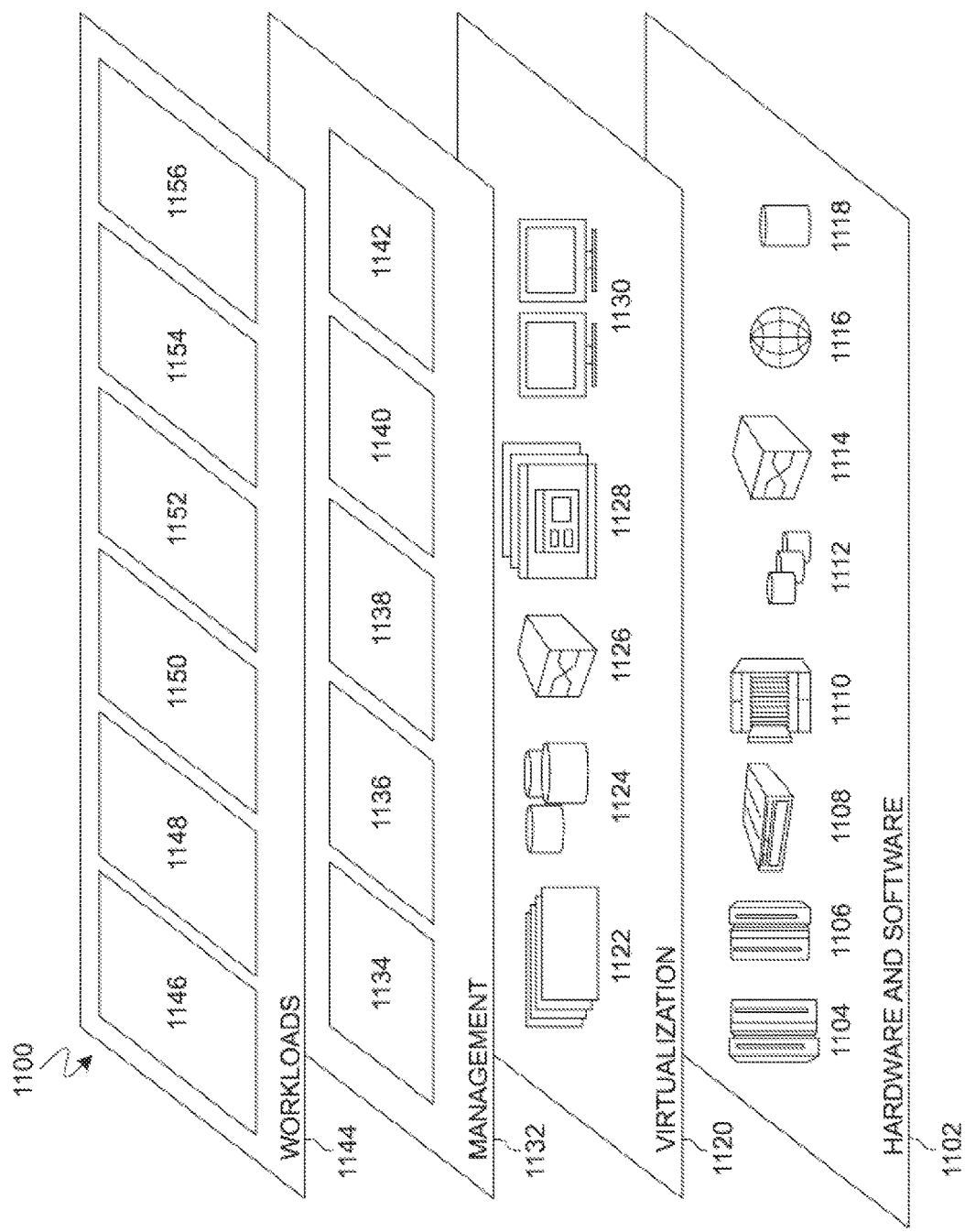
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and session authentication 1156. The cookie management program 110 and session authentication program 118 provide a way to determine session status and handle cookie based session timeout.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for detecting a session status based on a cookie associated with the session, the method comprising:
   receiving, by a server computer, an access request to a specified location associated with the server computer;
   determining, by the server computer, that the received access request has the cookie corresponding with the specified location, wherein the cookie is symmetrically or unsymmetrically encrypted, and wherein the server computer holds a cryptographic key to decrypt the cookie;
   determining, by the server computer, that the server computer cannot decrypt the cookie corresponding with the specified location;
   performing, by the server computer, a reauthentication process to obtain a unique session identifier, wherein the unique session identifier is comprised of a string of numbers specific to a client computer;
   generating, by the server computer, a new cookie based on obtaining the unique session identifier, wherein the new cookie contains a last refresh time set by the server computer, wherein the last refresh time is encrypted in the new cookie to prevent a fake instance of the client computer, and wherein the last refresh time is not saved on the server computer;
   storing, on and by the server computer, a refresh interval value representing a period of time in which the specified location associated with the server computer may idle, and an overdue value representing a period of time which exceeds an idle time and which may not require the reauthentication process, wherein the last refresh time is updated when the overdue value is reached; and
   sending, by the server computer, the new cookie to the client computer.

2. The method of claim 1, further comprising:
   retrieving, by the server computer, the last refresh time from the new cookie; and
   determining, by the server computer, the session status based on the retrieved last refresh time, a current request time, a refresh interval value, and the overdue value.

3. The method of claim 2, further comprising:
   querying, by the server computer, the current request time;
   decrypting, by the server computer, the new cookie to obtain the last refresh time contained within the new cookie; and
   retrieving, by the server computer, the refresh interval value and the overdue value.

4. The method of claim 2, wherein determining the session status based on the retrieved last refresh time, a current request time, the refresh interval value and the overdue value further comprises:
   determining, by the server computer, that the session expired based on calculating that a difference value corresponding to the current request time and the last refresh time is greater than or equal to an aggregate value corresponding to the refresh interval value and the overdue value.

5. The method of claim 4, wherein determining that the session expired further comprises:
   generating, by the server computer, a second new cookie;
   setting, by the server computer, the last refresh time; and
   saving, by the server computer, the refresh interval value and the overdue value.

6. The method of claim 2, wherein determining the session status based on the retrieved last refresh time, a current request time, the refresh interval value and the overdue value further comprises:
   determining, by the server computer, that the session is valid based on calculating that a difference value corresponding to the current request time and the last refresh time is not greater than or equal to an aggregate value corresponding to the refresh interval value and the overdue value;
   determining, by the server computer, that the difference value is not greater than or equal to the refresh interval value based on determining that the session is valid.

7. The method of claim 2, wherein determining the session status further comprises:
   determining, by the server computer, that the session is valid based on calculating that a difference value corresponding to the current request time and the last refresh time is not greater than or equal to an aggregate value corresponding to the refresh interval value and the overdue value;
   determining, by the server computer, that the difference value is greater than or equal to the refresh interval value based on determining that the session is valid;
   altering, by the server computer, the new cookie with an updated last refresh time based on determining that the difference value is greater than or equal to the refresh interval value; and
   sending, by the server computer, the altered new cookie to a client computer.

8. A computer system for detecting a session status based on a cookie associated with the session, comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   receiving, by a server computer, an access request to a specified location associated with the server computer;
   determining, by the server computer, that the received access request has the cookie corresponding with the specified location, wherein the cookie is symmetrically or unsymmetrically encrypted, and wherein the server computer holds a cryptographic key to decrypt the cookie;
   determining, by the server computer, that the server computer cannot decrypt the cookie corresponding with the specified location;
   performing, by the server computer, a reauthentication process to obtain a unique session identifier, wherein the unique session identifier is comprised of a string of numbers specific to a client computer;
   generating, by the server computer, a new cookie based on obtaining the unique session identifier, wherein the new cookie contains a last refresh time set by the server computer, wherein the last refresh time is encrypted in the new cookie to prevent a fake instance of the client computer, and wherein the last refresh time is not saved on the server computer;

storing, on and by the server computer, a refresh interval value representing a period of time in which the specified location associated with the server computer may idle, and an overdue value representing a period of time which exceeds an idle time and which may not require the reauthentication process, wherein the last refresh time is updated when the overdue value is reached; and sending, by the server computer, the new cookie to the client computer.

9. The computer system of claim 8, further comprising:
retrieving, by the server computer, the last refresh time from the new cookie; and
determining, by the server computer, the session status based on the retrieved last refresh time, a current request time, a refresh interval value, and the overdue value.

10. The computer system of claim 9, further comprising:
querying, by the server computer, the current request time;
decrypting, by the server computer, the new cookie to obtain the last refresh time contained within the new cookie; and
retrieving, by the server computer, the refresh interval value and the overdue value.

11. The computer system of claim 9, wherein determining the session status based on the retrieved last refresh time, a current request time, the refresh interval value and the overdue value further comprises:
determining, by the server computer, that the session expired based on calculating that a difference value corresponding to the current request time and the last refresh time is greater than or equal to an aggregate value corresponding to the refresh interval value and the overdue value.

12. The computer system of claim 11, wherein determining that the session expired further comprises:
generating, by the server computer, a second new cookie;
setting, by the server computer, the last refresh time; and
saving, by the server computer, the refresh interval value and the overdue value.

13. The computer system of claim 9, wherein determining the session status based on the retrieved last refresh time, a current request time, the refresh interval value and the overdue value further comprises:
determining, by the server computer, that the session is valid based on calculating that a difference value corresponding to the current request time and the last refresh time is not greater than or equal to an aggregate value corresponding to the refresh interval value and the overdue value;
determining, by the server computer, that the difference value is not greater than or equal to the refresh interval value based on determining that the session is valid.

14. The computer system of claim 9, wherein determining the session status further comprises:
determining, by the server computer, that the session is valid based on calculating that a difference value corresponding to the current request time and the last refresh time is not greater than or equal to an aggregate value corresponding to the refresh interval value and the overdue value;
determining, by the server computer, that the difference value is greater than or equal to the refresh interval value based on determining that the session is valid;

altering, by the server computer, the new cookie with an updated last refresh time based on determining that the difference value is greater than or equal to the refresh interval value; and
sending, by the server computer, the altered new cookie to a client computer.

15. A computer program product for detecting a session status based on a cookie associated with the session, comprising:
one or more computer-readable storage medium and program instructions stored on at least one of the one or more tangible storage medium, the program instructions executable by a processor, the program instructions comprising:
program instructions to receive, by a server computer, an access request to a specified location associated with the server computer;
program instructions to determine, by the server computer, that the received access request has the cookie corresponding with the specified location, wherein the cookie is symmetrically or unsymmetrically encrypted, and wherein the server computer holds a cryptographic key to decrypt the cookie;
program instructions to determine, by the server computer, that the server computer cannot decrypt the cookie corresponding with the specified location;
program instructions to perform, by the server computer, a reauthentication process to obtain a unique session identifier, wherein the unique session identifier is comprised of a string of numbers specific to a client computer;
program instructions to generate, by the server computer, a new cookie based on obtaining the unique session identifier, wherein the new cookie contains a last refresh time set by the server computer, wherein the last refresh time is encrypted in the new cookie to prevent a fake instance of the client computer, and wherein the last refresh time is not saved on the server computer;
program instructions to store, on and by the server computer, a refresh interval value representing a period of time in which the specified location associated with the server computer may idle, and an overdue value representing a period of time which exceeds an idle time and which may not require the reauthentication process, wherein the last refresh time is updated when the overdue value is reached; and
program instructions to send, by the server computer, the new cookie to the client computer.

16. The computer program product of claim 15, further comprising:
program instructions to retrieve, by the server computer, the last refresh time from the new cookie; and
program instructions to determine, by the server computer, the session status based on the retrieved last refresh time, a current request time, the refresh interval value, and the overdue value.

17. The computer program product of claim 16, further comprising:
program instructions to query, by the server computer, the current request time;
program instructions to decrypt, by the server computer, the new cookie to obtain the last refresh time contained within the new cookie; and
program instructions to retrieve, by the server computer, the refresh interval value and the overdue value.

18. The computer program product of claim 16, wherein determining the session status based on the retrieved last refresh time, a current request time, the refresh interval value and the overdue value further comprises:

program instructions to determine, by the server computer, that the session expired based on calculating that a difference value corresponding to the current request time and the last refresh time is greater than or equal to an aggregate value corresponding to the refresh interval value and the overdue value.

19. The computer program product of claim 16, wherein determining the session status based on the retrieved last refresh time, a current request time, a refresh interval value and the overdue value further comprises:

program instructions to determine, by the server computer, that the session is valid based on calculating that a difference value corresponding to the current request time and the last refresh time is not greater than or equal to an aggregate value corresponding to the refresh interval value and the overdue value;

program instructions to determine, by the server computer, that the difference value is not greater than or equal to the refresh interval value based on determining that the session is valid.

20. The computer program product of claim 16, wherein determining the session status further comprises:

program instructions to determine, by the server computer, that the session is valid based on calculating that a difference value corresponding to the current request time and the last refresh time is not greater than or equal to an aggregate value corresponding to the refresh interval value and the overdue value;

program instructions to determine, by the server computer, that the difference value is greater than or equal to the refresh interval value based on determining that the session is valid;

program instructions to alter, by the server computer, the new cookie with an updated last refresh time based on determining that the difference value is greater than or equal to the refresh interval value; and program instructions to send, by the server computer, the altered new cookie to a client computer.

\* \* \* \* \*